United States Patent [19]

Hitomi

[11] Patent Number: 5,149,006
[45] Date of Patent: Sep. 22, 1992

[54] BAIL ARM SUPPORTING MECHANISM OF FISHING REEL

[75] Inventor: Yasuhiro Hitomi, Sakai, Japan

[73] Assignee: Shimano Industrial Co., Ltd., Sakai, Japan

[21] Appl. No.: 619,910

[22] Filed: Nov. 30, 1990

[30] Foreign Application Priority Data

Dec. 2, 1989 [JP] Japan .................. 1-140084[U]

[51] Int. Cl.⁵ .................................................. A01K 89/01
[52] U.S. Cl. .................................. 242/231; 384/295; 384/296
[58] Field of Search ............... 242/230, 231, 232, 233; 354/295, 296

[56] References Cited

U.S. PATENT DOCUMENTS

| | | | |
|---|---|---|---|
| 1,603,022 | 10/1926 | Briney | 384/296 X |
| 1,849,963 | 3/1932 | Snow | 384/296 |
| 2,191,528 | 2/1940 | Hewel | 384/296 X |
| 2,250,753 | 7/1941 | Dieckmann | 384/296 X |

FOREIGN PATENT DOCUMENTS

| | | | |
|---|---|---|---|
| 1215760 | 4/1960 | France | 242/232 |
| 1299685 | 6/1962 | France | 242/230 |
| 49-7198 | 2/1974 | Japan | 242/232 |
| 1-59063 | 1/1989 | Japan . | |

*Primary Examiner*—Katherine Matecki
*Attorney, Agent, or Firm*—Dickstein, Shapiro & Morin

[57] ABSTRACT

Disclosed is a bail arm supporting mechanism of a fishing reel. The mechanism has a link member having a large-diameter connecting portion for supporting and connecting one end of a bail arm and a support shaft portion to be connected to an arm lever. The mechanism further has a bush and a freely rotatable line guide roller to be fitted one after another in the mentioned order on the support shaft portions. The large-diameter connecting portion has a recess at a lateral face thereof to be attached with the arm lever. The bush includes an insert portion for coming into the recess and abutment against the bail arm in a direction normal to the support shaft portion.

5 Claims, 2 Drawing Sheets

BAIL ARM SUPPORTING MECHANISM OF FISHING REEL

BACKGROUND OF THE INVENTION

1. Field of the Invention

The present invention relates to a bail arm supporting mechanism of a fishing reel, and more particularly to a bail arm supporting mechanism of a fishing reel including a link member having a large-diameter connecting portion for supporting and connecting one end of a bail arm and a support shaft portion to be connected to an arm lever, and a bush and a freely rotatable line guide roller to be fitted one after another in the mentioned order on the support shaft portion.

2. Description of the Related Art

A typical conventional bail arm construction of the above-described type is shown in FIG. 4. In this construction, the large-diameter portion $9b'$, for connecting the bail $8'$, of the link member $9'$ is formed as a solid structure; whereas, the bush $10'$ is constructed as a circular cylinder structure to be fitted on the support shaft portion $9a'$ which is formed also cylindrical. This support shaft portion $9a'$ has its base end connected to an arm lever $7a'$ by means of a screw $17'$ and a line roller $11'$ is rotatably fitted on the bush $10'$.

Further, the large-diameter portion $9b'$ is provided for smoothly and reliably guiding a line delivered from the spool through one end of the bail onto the line roller. Generally, the bail and the large-diameter portion, which are subjected to a significant line tension, is formed of metallic material, and also the large-diameter portion is formed as a solid structure for firmly connecting and supporting the bail. Accordingly, the heavy weight of these portions tend to impair the total weight balance of the entire bail arm supporting mechanism. With such imbalance of weight, in the course of high-speed line winding operation, there tends to occur vibration of the rotary axis, which is transmitted to and vibrates the fishing rod as well.

Further, since the bush provided for smooth line roller rotation is formed as a cylindrical structure, there occurs relative rotation through sliding contact between the line roller and the bush as well as between the bush and the support shaft portion. Consequently, any difference between the above two kinds of sliding contact resistances may render the rotation of the line roller unstable; and this unstable line roller rotation provides the user with an uncomfortable 'jerky' feeling.

The present invention intends to overcome these problems of the prior art through rational improvement of the bail arm supporting mechanism.

SUMMARY OF THE INVENTION

For achieving the above-noted object, in a fishing reel bail arm supporting mechanism of the aforementioned type, according to the improvement provided by the present invention, the large-diameter connecting portion has a recess at a lateral face thereof to be attached with the arm lever; and the bush includes an insert portion for coming into the recess and abutment against the bail arm in a direction normal to the support shaft portion.

With the above feature of the invention, the aforementioned relative rotation between the bush and the support shaft portion can be effectively avoided as the insert portion from the normal direction against the bail which comes into the recess. With the effective prevention of this relative rotation, the relative rotation through sliding contact occurs only between the line roller and the bush. Accordingly, the line roller effects very stable rotation. Moreover, another advantage of the above feature is that no special additional member is needed for achieving the stable line roller rotation.

Thus, the bail arm supporting mechanism afforded with the invention's improvement is simple, yet lightweight due to the weight reduction at the support portion for the bail and has good weight balance. In this way, the invention has solved the problem of axis vibration during high-speed rotation. Further, since the bail acts also for preventing the relative rotation of the bush, the invention has solved the problem of unsmooth, jerky feel during a line feeding operation.

For advantageously embodying the present invention, the bush is formed of a material lighter than a material forming the large-diameter connecting portion and the insert portion includes an engaging portion to be engaged with the bail arm in the direction normal to the support shaft portion. With these arrangements, it becomes possible to effectively protect the insert portion against possible intrusion of foreign substance, yet the weight of this portion can be further reduced. Moreover, the engagement between the insert portion and the bail arm can advantageously increase the strength against torque generated due to the prevention of relative rotation.

Further advantageously, the recess can be formed as an annular recess defined about the support shaft portion while forming the insert portion annular also to be fitted into the annular recess and the engaging portion can be formed as a groove. The annular formation of the recess and the insert portion is advantageous for manufacturing while the groove shape of the engaging portion can effectively prevent relative rotation between the annular recess and the annular insert portion.

Also, it is conceivable to form the bush of a material having low frictional resistance and to reduce an outer diameter of the line roller relative to an inner diameter of the recess. With this, even if one lateral side of the line roller should come into sliding contact with the bush, the low frictional resistance of the bush will not significantly affect the rotation of the line roller.

Further and other objects, features and effects of the invention will become more apparent from the following more detailed description of the embodiment of the invention with reference to the accompanying drawings.

BRIEF DESCRIPTION OF THE DRAWINGS

Accompanying drawings FIGS. 1 through 3 show one preferred embodiment of a bail arm supporting mechanism of a fishing reel related to the present invention; in which, FIG. 1 is a section view showing major portions of the mechanism, FIG. 2 is an exploded perspective view of the major portions, FIG. 3 is a side view showing the entire fishing reel.

DESCRIPTION OF THE PREFERRED EMBODIMENT

A preferred embodiment of the present invention will now be described in particular with reference to the accompanying drawings.

Figure 3:
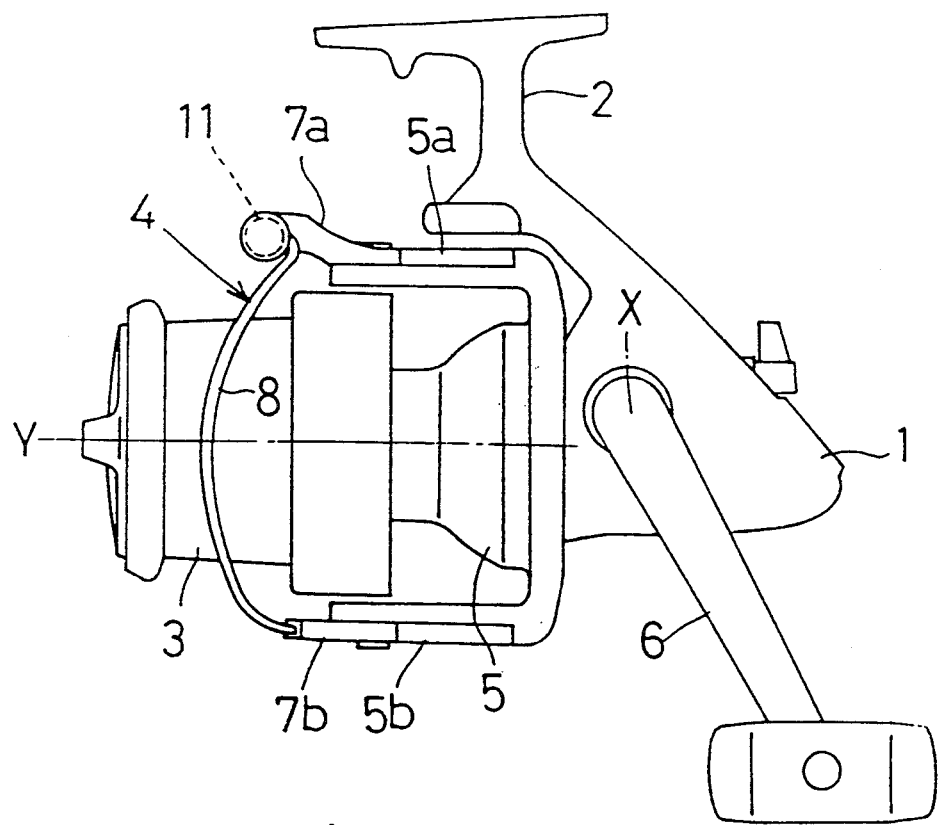
Figure 4:
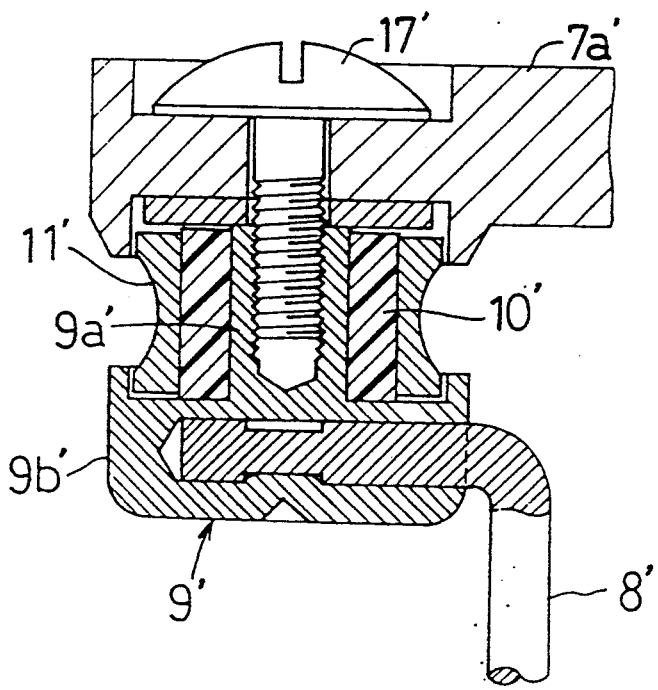
FIG. 4 is a section view showing major portions of a conventional bail arm supporting mechanism.

FIG. 3 shows an entire fishing reel. This fishing reel includes a reel body 1, an attaching leg 2 extending integrally from the reel body 1 for attachment to a fishing rod, a line-winding spool 3 attached to a front side of the reel body 1, and a rotar 5 fitted on an outer periphery of the spool 3 and having a line-guiding bail arm supporting mechanism 4 and a handle 6 attached to a lateral side of the reel body 1.

In operation, with manual rotation of the handle 6 about a horizontal axis X, the rotar 5 is driven about a longitudinal axis Y through an unillustrated gear transmission accommodated in the reel body 1 and also the spool effects a reciprocating motion by a predetermined pitch along the axis Y. Accordingly, the line-guiding rotary motion of the bail arm supporting mechanism 4 and the reciprocating motion of the spool 3 together act for evenly winding a fishing line about the periphery of the spool 3.

The bail arm supporting mechanism 4 includes a pair of arm portions 5a and 5b extending forwardly relative to the rotar 5 to swingably support opposed end of a line guiding bail arm 8 (formed of e.g. metallic material) extending between the arm portions 5a, 5b along the periphery of the spool 3 through arm levers 7a, 7b attached to the arm portions 5a, 5b, so that the bail arm 8 is swingable at its opposed ends about a lateral axis. Further, there is provided a support shaft portion 9a of a link member 9 for supporting and connecting one end of the bail arm 8 and adapted also for attachment with the arm lever 7a. Then, on this support shaft portion 9a, a line-guiding roller 11 is fitted via a bush 10. The link member 9 includes also a large-diameter connecting portion 9b for connection with the bail arm 8. This large-diameter connecting portion 9b forms, at its end face on the side of the support shaft portion 9a (i.e. adjacent the arm lever 7a), an annular recess 12, and the entire connecting portion 9b is constructed as a drumlike structure. The bush 10 is so disposed as to be fitted into the annular recess 12 and this bush 10 includes an insert portion 10a where an engaging portion 13 is formed for engagement with the bail arm 8 along its radial direction (i.e. in a direction normal to the support shaft portion 9a).

In this particular embodiment, the bush 10 is formed of polyacetal resin (trademark: "Celcon") which has a small friction coefficient, a small absorption coefficient and is lighter than material forming the link member 9.

Figure 1:
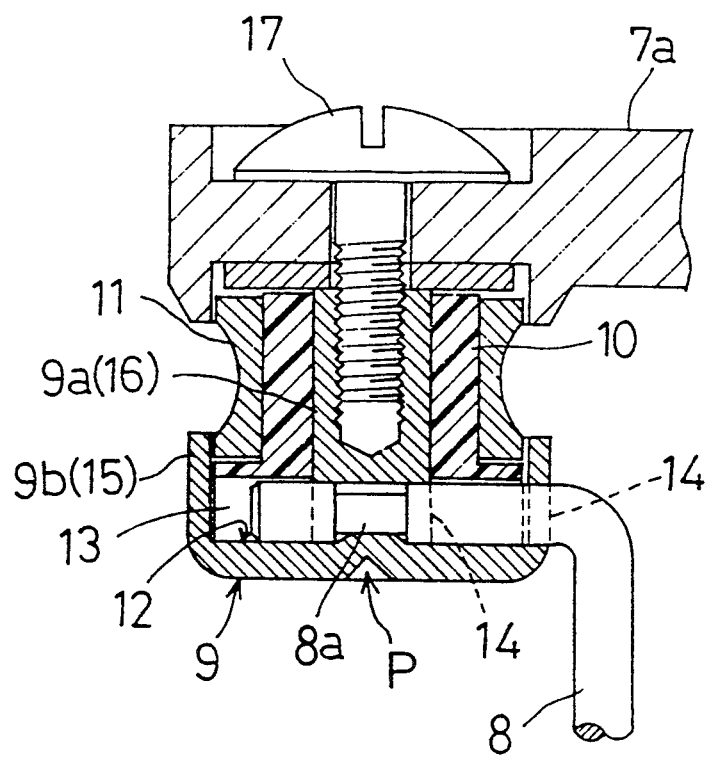
Figure 2:
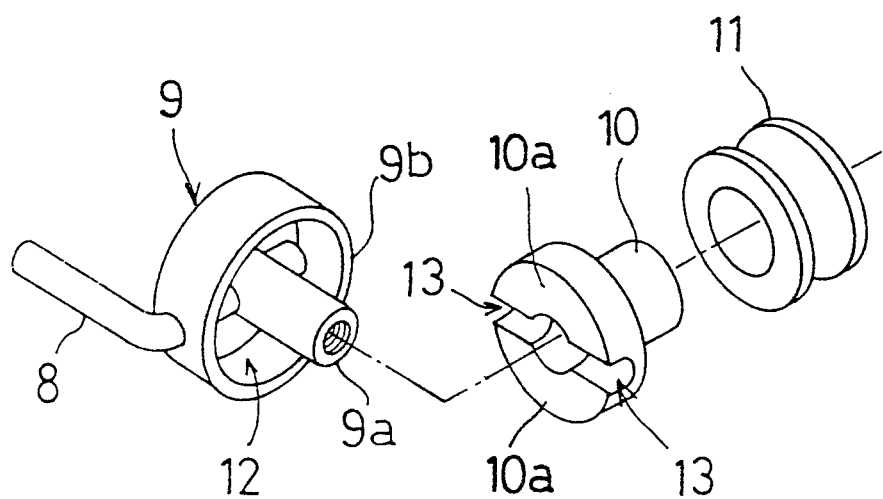

More particularly, as shown in FIGS. 1 and 2, the large-diameter portion 9b of the link member 9 defines, through an outer peripheral thin portion 15 and a central support shaft portion 16, a through hole 14 into which the bail arm 8 is fitted along the radial direction and firmly fixed therein by calking. That is, the bail arm 8 forms a small-diameter portion 8a at a position corresponding to the support shaft portion 9a, such that the inserted bail arm 8 can be calked at a center P from the outside and reliably and firmly supported therein. The insert portion 10a of the bush 10 is formed as a cylindrical large-diameter structure adapted to be appropriately fitted into the annular portion 12. Also, the insert portion 10a defines, in its inner end face, a radial groove acting as the engaging portion 13, so that a screw 17 screwed from the leading end of the support shaft portion 9b can firmly fixed the bail arm 8 to the arm lever 7a.

With the above-detailed hollow construction, the link member 9 formed of metallic material for resisting line tension can be formed light in weight. Consequently, the weight balance of the entire bail arm supporting mechanism 4 has been improved, which improved weight balance can effectively avoid axial vibration during a high-speed line-winding operation. Further, because the relative rotation of the bush is effectively prevented, the line roller 11 can effect stable rotation for enabling smooth line feeding and winding operations.

Moreover, the hollow construction is also advantageous for allowing an increase in the diameter of the line roller 11 withough significantly increasing the weight of the entire mechanism. And, such increased diameter of the line roller 11 can effectively restrict a curling phenomenon of the line which tends to occur through contact between the line and the roller.

It is not essential for the insert portion 10a to be formed annular. Also, this insert portion 10a can function sufficiently even if the portion 10a merely comes into abutment against the support shaft portion 9a.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A bail arm supporting mechanism of a fishing reel, the mechanism comprising:
   an arm lever;
   a bail formed of a bar-like member;
   a link member including a support shaft portion, said link member including means for fixedly connecting one end of said support shaft portion to said arm lever, said link member including at the other end of said support shaft portion a cylindrical large-diameter connecting portion, to which a connecting end of said bail is fixedly connected;
   a recess formed in a face of said large-diameter connecting portion facing said arm lever;
   a bush fitted on said support shaft portion,
   said bush including an insert portion at one end thereof facing said large-diameter connecting portion and fitted into said recess; and
   a line guide roller rotatably mounted on said bush;
   wherein said connecting end of the bail is fitted into said large-diameter connecting portion from a lateral wall to a center of said large-diameter connecting portion with a portion of said connecting end being exposed to said recess, said insert portion including an engaging portion to engage said exposed portion of said connecting end.

2. A bail arm supporting mechanism as defined in claim 1, wherein said recess is an annular recess defined along a periphery of said support shaft portion and said insert portion is annular, said engaging portion comprising a groove in an end face of said insert portion.

3. A bail arm supporting mechanism as defined in claim 2, wherein an outer diameter of said line guide roller is less than an inner diameter of said recess.

4. A bail arm supporting mechanism as defined in claim 1, wherein said engaging portion is located along a radius of said insert portion and includes a first engaging portion extending from said lateral wall of the large-diameter connecting portion to a center thereof and a second engaging portion disposed opposed to said first engaging portion across said center of the large-diameter connecting portion.

5. A bail arm supporting mechanism of a fishing reel, the mechanism comprising:

an arm lever;

a bail formed of a bar-like member;

a link member including a support shaft portion, said link member including means for fixedly connecting one end of said support shaft portion to said arm lever, said link member including at the other end of said support shaft portion a large-diameter connecting portion, to which a connecting end of said bail is fixedly and non-rotatably connected;

a bush fitted on said support shaft portion; and a line guide roller rotatably fitted on said bush;

wherein said connecting end of the bail is fitted into said large-diameter connecting portion from a lateral wall to a center of said large-diameter connecting portion, said bush including an engaging portion which directly engages said connecting end of said bail.

* * * * *